US008799777B1

(12) United States Patent
Lee et al.

(10) Patent No.: US 8,799,777 B1
(45) Date of Patent: Aug. 5, 2014

(54) SELECTABILITY OF OBJECTS ON A TOUCH-SCREEN DISPLAY (75) Inventors: Woojae Lee, Manhattan, KS (US); Cesar Perez, Olathe, KS (US); Ryan Patrick Dreiling, Overland Park, KS (US); Jason D. Cole, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1137 days.

(21) Appl. No.: 12/501,719

(22) Filed: Jul. 13, 2009

(51) Int. Cl.
*G06F 3/048* (2013.01)

(52) U.S. Cl.
CPC ...................................... *G06F 3/048* (2013.01)
USPC .......................................... 715/702; 715/773

(58) Field of Classification Search
CPC ........................................................ G06F 3/048
USPC .................................. 715/773, 702; 345/173
See application file for complete search history.

(56) References Cited

U.S. PATENT DOCUMENTS

| 2001/0040562 | A1* | 11/2001 | Masudaya ................... 345/173 |
| 2008/0096610 | A1* | 4/2008 | Shin et al. .................... 455/566 |
| 2008/0165147 | A1* | 7/2008 | Christie et al. .............. 345/173 |
| 2009/0237372 | A1* | 9/2009 | Kim et al. ................... 345/173 |
| 2010/0070931 | A1* | 3/2010 | Nichols ....................... 715/863 |
| 2010/0251176 | A1* | 9/2010 | Fong et al. .................. 715/821 |

FOREIGN PATENT DOCUMENTS

JP          2004118484       *    4/2004    ............... G06F 3/00

OTHER PUBLICATIONS

Japanese translation Doc 2004118484 (translated date: Aug. 2, 2012 from JP 2004118484 date: Apr. 15, 2004, 18 pages).*
JP2004118484_ABSTRACT (translated date: Aug. 2, 2012 from JP 2004118484 date: Apr. 15, 2004, 1 page).*

* cited by examiner

*Primary Examiner* — Omar Abdul-Ali
*Assistant Examiner* — Phuong Nguyen (57) ABSTRACT

A system and method for disambiguating a selection made on a touch-screen display is provided. Embodiments of the present invention determine when selectable objects are either too small or too closely spaced together to be easily selected through a touch-screen display. The selectablity of these objects may be improved by presenting them for selection in an enhanced presentation. The enhanced presentation may be generated by zooming into selectable objects or rerendering the display to increase the space between the selectable objects. Display of the enhanced presentation may be triggered by detecting selection of a selectable object.

15 Claims, 10 Drawing Sheets

SELECTABILITY OF OBJECTS ON A TOUCH-SCREEN DISPLAY

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having one or more computer-executable instructions embodied thereon for performing a method of enhancing selectability of objects displayed on a touch-screen display are provided. The method includes determining that a selection cluster is displayed on the touch-screen display. The selection cluster is a group of two or more selectable objects characterized by a relative closeness to each other that creates a certain level of difficulty in selecting any one of said selectable objects. The method also includes receiving through the touch-screen display a first user selection of an individual selectable object within the selection cluster. The method also includes displaying an enhanced presentation that includes at least a portion of the selectable objects within the selection cluster. The enhanced presentation increases an ease with which the selectable objects within the selection cluster may be selected through the touch-screen display. The method also includes receiving a second user selection through the touch-screen display of the individual selectable object within the selection cluster. The method further includes changing content displayed on the touch-screen display according to instructions associated with selection of the individual selectable object.

In another illustrative embodiment, one or more computer-readable media having one or more computer-executable instructions embodied thereon for performing a method of enhancing selectability of objects displayed on a touch-screen display are provided. The method includes receiving, through the touch-screen display, a first indication that a physical object is contacting the touch-screen display at a first location corresponding to a first selectable object being displayed on the touch-screen display, thereby indicating a presumptive selection of the first selectable object. The method also includes determining that the first selectable object is less than a threshold distance from a second selectable object. The method further includes, prior to taking action based on the presumptive selection of the first selectable object, displaying an enhanced presentation of at least the first selectable object and the second selectable object. The method also includes receiving, through the touch-screen display, a second indication that the physical object is touching the touch-screen display at a second location corresponding to an individual selectable object presented in the enhanced presentation, thereby indicating a definite selection of the individual selectable object.

In a third illustrative embodiment, a method of disambiguating a selection of an object on a touch-screen display is provided. The method includes receiving, at a mobile device that is coupled to the touch-screen display, a first indication that a physical object is held on the touch-screen display at a first location on the touch-screen display longer than a threshold time period. The method also includes determining that a selectable object is displayed on a user interface proximate to the first location on the touch-screen display. The method further includes changing the user interface to enlarge the selectable object, thereby indicating that the selectable object is presumptively selected. The method also includes receiving a second indication that the physical object has been removed from a second location on the touch-screen display that is proximate to where a particular selectable object is displayed on the touch-screen display. The method also includes changing the user interface according to an instruction associated with selecting the particular selectable object.

BRIEF DESCRIPTION OF THE SEVERAL VIEWS OF THE DRAWINGS

Illustrative embodiments of the present invention are described in detail below with reference to the included drawing FIG.s, wherein.

DETAILED DESCRIPTION

Embodiments of the present invention improve the ease with which a user may select a selectable object on a touch-screen display. Examples of selectable objects include hyperlinked text and icons. Individual selectable objects may be difficult to select when they are closely grouped together. Embodiments of the present invention improve the selectability of selectable objects by increasing the distance between selectable objects in a selection cluster. More space may be created between selectable objects by zooming into an area of the user interface that has multiple, closely spaced, selectable objects. In another embodiment, the distance between selectable objects may be increased by rearranging the selectable objects on the display. In one embodiment, the zooming or rearranging occurs in a pop-up window that is displayed on top of the original user interface.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile-Communications |
| LAN | Local Access Network |
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data presentations. Media examples include, but are not limited to, information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Figure 1:
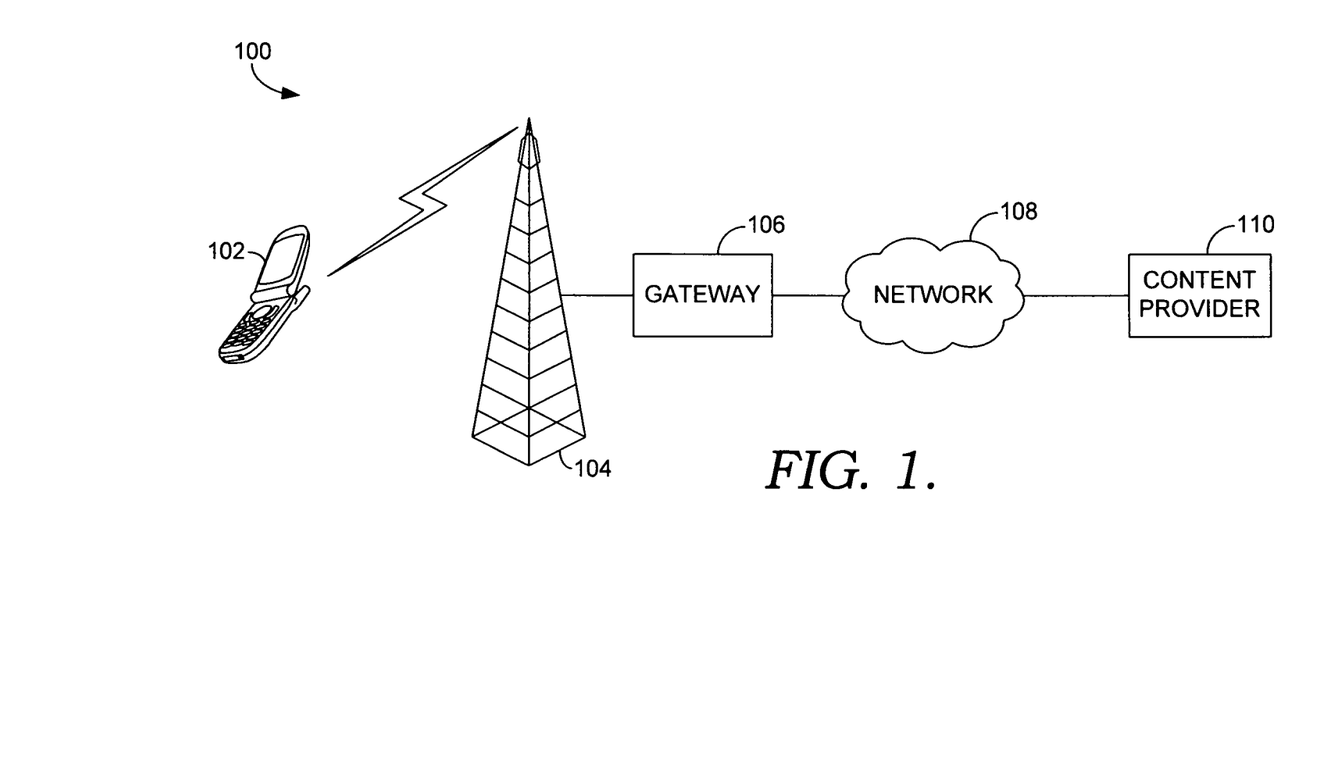
FIG. 1 is a drawing showing an illustrative operating environment suitable for use with an embodiment of the present invention.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes a mobile device 102, a base station 104, a gateway 106, a network 108, and a content server 110. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

The mobile device 102 may take on any of a variety of forms. By way of example, mobile device 102 may be a mobile telephone, smart phone, laptop computing device, desktop computing device, server, personal digital assistant ("PDA") or any combination of these or other devices. The mobile device 102 includes a touch-screen display for receiving input from a user. The touch-screen display may present a user interface with multiple selectable items that may be chosen by a user touching the screen with a finger or stylus. Mobile device 102 is capable of accessing content over the Internet. Examples of content that may be received include text messages, multimedia messages, emails, calendar updates, web pages, videos, pictures, and task reminders.

The mobile device 102 may be associated with a user. For example, a text message sent to mobile device 102 would be intended for the user. The user is the ultimate recipient of communications (e.g., emails, phone calls, text messages) and media content sent to mobile device 102.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Gateway 106 provides a boundary between radio communication functions embodied in one or more radio-access systems that form the access-facing portion of illustrative operating environment 100 and the standard internet protocol ("IP") communication functions (including Mobile IP) embodied in the public-network facing portion (e.g., network 112) of illustrative operating environment 100. Access gateway 106 might be, for example, an ASN-GW, a PDSN, a SGSN/GGSN, and the like. The gateway 106 includes a computing device that may include a CPU, short-term memory, long-term memory, and one or more network interfaces. The network interfaces are used to communicate data between the network 112 and devices, such as mobile device 102, connected to the access-facing portion of illustrative operating environment 100. A network interface to the WAN or LAN could be wired, wireless, or both.

Network 108 may include one or more mobile networks, one or more packet-based networks, including the Internet, and the public-switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The content server 110 is stores media content and communicates it to a user upon receiving a request for the media. Examples of media content include web pages, videos, audio files, and games. The content server 110 includes a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the content server 110 facilitates transmission of media content (e.g. movies, web pages, videos, MP3s, etc.) to mobile device 102. The content server 110 transmits the media content over the network 108. The content server 110 may also host web pages that are transmitted to a requesting device as an interface to access other content.

Figure 2:
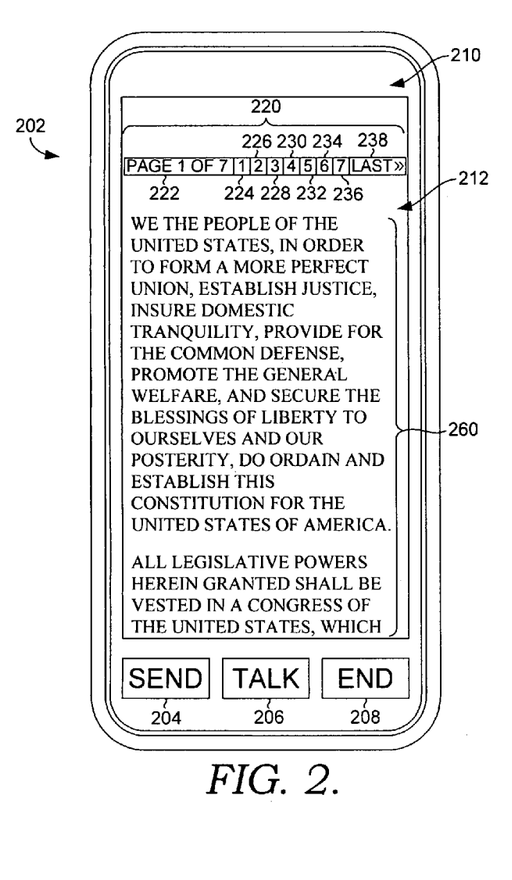
FIG. 2 is a diagram showing a touch-screen display displaying a user interface containing a selection cluster, in accordance with an embodiment of the present invention.

Turning now FIG. 2, a mobile device 202 displaying, on a touch-screen display 210, a user interface 212 containing a selection cluster is shown, in accordance with an embodiment of the present invention. The mobile device 202 may be similar to mobile device 102 described previously with reference to FIG. 1. The mobile device 202 may be a PDA, smart phone, or other similar computing device. The mobile device 202 includes a send button 204, a talk button 206, and an end button 208. These buttons may be used to place a telephone call and perform other functions on the mobile device 202. Embodiments of the present invention are not limited to devices that include these buttons. The mobile device 202 includes a touch-screen display 210. A touch-screen display 210 receives input through a physical object contacting the surface of the touch screen 210. Examples of physical objects that may be used to contact the touch screen 210 include a human finger and a stylus.

The user interface 212 shows a webpage that includes content 260 and control bar 220. The user may access additional content by selecting the page buttons included on the control bar 220. The control bar 220 includes a status indicator 222, a first-page button 224, a second-page button 226, a third-page button 228, a fourth-page button 230, a fifth-page button 232, a sixth-page button 234, a seventh-page button 236, and a last-page button 238. The status indicator 222 displays how many pages may be accessed through the control bar 220 and the present page displayed. For example, the status indicator 222 indicates that page one of seven total pages is presently displayed. The content 260 shown is the content of page one. Selecting the first-page button 224 displays the content on the first page. Selecting the second-page button 226 displays the content on the second page. Selecting the third-page button 228 displays the content on the third page. Selecting the fourth-page button 230 displays the content on the fourth page. Selecting the fifth-page button 232 displays the content on the fifth page. Selecting the sixth-page button 234 causes the content of the sixth page to be displayed. Selecting the seventh-page button 236 causes the content of the seventh page to be displayed. Selecting the last-page button 238 causes the content on the last page in a series of pages to be displayed.

All the buttons within the control bar 220 are closely spaced together. A user attempting to select one of these buttons may inadvertently select an adjacent button. The buttons of control bar 220 may be considered a selection cluster by embodiments of the present invention because of the small distance between the buttons and the small size of the buttons. Upon determining that a selection cluster is displayed on a user interface, embodiments of the present invention may display an enhanced presentation on the user interface to improve the ease with which a user may select one or more objects within the selection cluster.

Embodiments of the present invention may detect a selection cluster when above a threshold number of selectable objects are displayed within an area of screen real estate. In another embodiment, a selection cluster is determined to be present when multiple selectable objects are separated by less than a threshold distance. The threshold distance may change depending on the size of the selectable objects. For example, when selectable objects are very large, the threshold distance may be very small. On the other hand, if the selectable objects are very small then they will need more distance between them to be easily selected. Thus, when the selectable objects are very small, the threshold distance may be larger than when the selectable objects are large. Upon determining that two or more selectable objects satisfy the criteria to be a selection cluster, an enhanced presentation may be displayed to make the selectable objects easier to select. In one embodiment, the enhanced presentation is displayed after one of the selectable objects in the selection cluster is selected. Examples of enhanced presentations are shown in several of the following figures.

Figure 3:
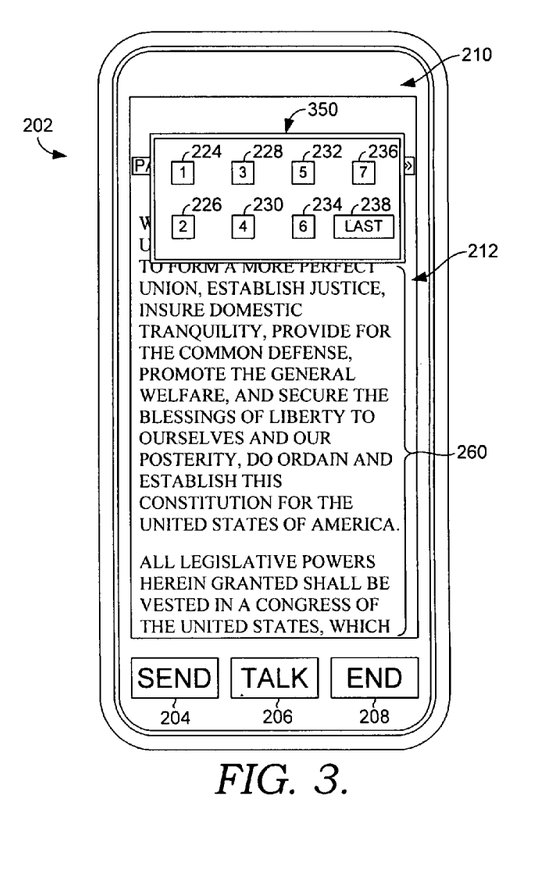
FIG. 3 is a diagram showing an enhanced presentation of selectable objects within a selection cluster, in accordance with an embodiment of the present invention.

Turning now to FIG. 3, an enhanced presentation of selectable objects within a selection cluster is shown, in accordance with an embodiment of the present invention. In one embodiment, the display of the enhanced presentation is activated upon detecting a presumptive selection of one of the buttons within the control bar 220. For the sake of illustration, an embodiment of the present invention determined that the buttons within the control bar 220 formed a selection cluster that warranted an enhanced presentation of the selectable objects within the selection cluster.

The enhanced presentation is displayed in a pop-up window 350. The pop-up window is displayed on top of the user interface 212 displayed previously in FIG. 2. In the embodiment shown, the pop-up window 350 is also shown near the location of the selection cluster. The enhanced presentation within the pop-up window 350 includes the first-page button 224, the second-page button 226, the third-page button 228, the fourth-page button 230, the fifth-page button 232, the sixth-page button 234, the seventh-page button 236, and the last-page button 238. Each of the buttons is the same size as in FIG. 2. However, the buttons are now separated by a greater distance that increases the ease with which the buttons may be selected.

The status indicator 222 is not displayed on the enhanced presentation. As described previously, the status indicator 222 is not selectable but simply indicates which page is currently displayed. Because it is not selectable, the status button does not need to be included in the enhanced presentation. However, embodiments of the present invention may include nonselectable items in the enhanced presentation. Thus, the enhanced presentation shown in FIG. 3 increases the ease of selection by increasing the space between the selectable objects without changing the size of the selectable objects. In the embodiment shown, all of the selectable objects within the selection cluster are shown in the enhanced presentation. But, not every selectable object within the selection cluster need be shown in an enhanced presentation. In some embodiments, only the selectable objects nearest the presumptive selection of a selectable object will be shown in the enhanced presentation.

Figure 4:
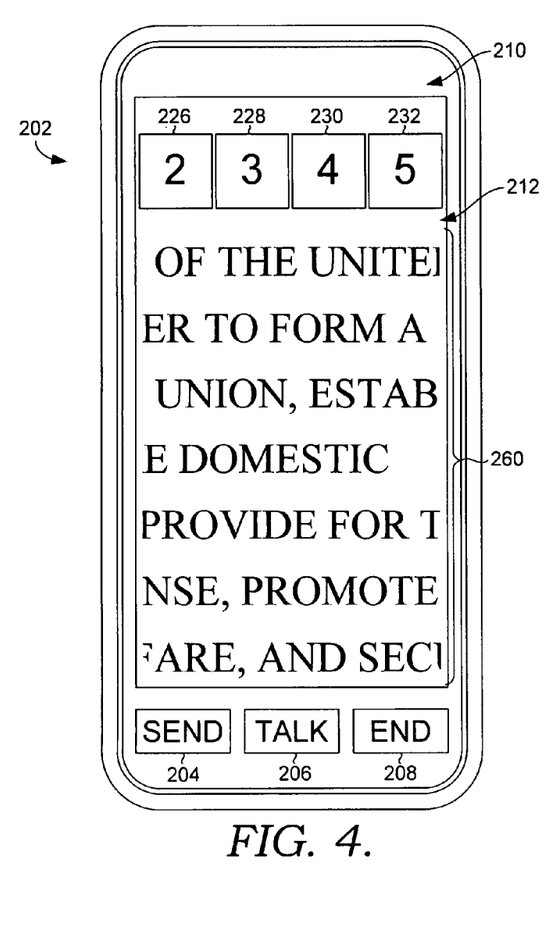
FIG. 4 is a diagram showing an enhanced presentation generated by zooming into selectable objects within a selection cluster, in accordance with an embodiment of the present invention.

Turning now to FIG. 4, an additional enhanced presentation generated by zooming into selectable objects within a selection cluster is shown, in accordance with an embodiment of the present invention. The enhanced presentation shown in FIG. 4 may be activated upon determining that the user has attempted to select one of the buttons within the control bar 220. As described previously, the buttons within the control bar 220 may form a selection cluster, because they are small and closely spaced together. For the sake of this illustration, the user presumptively selected the third-page button 228. The enhanced presentation is generated by zooming into the portion of the user interface 212 displaying the selection cluster. The degree of zoom used to generate the enhanced presentation may vary depending on the size and spacing between the selectable objects within the selection cluster. The enhanced presentation shows the second-page button 226, the third-page button 228, the fourth-page button 230, and the-fifth page button 232. Upon displaying the enhanced presentation including a portion of the selection cluster, a selection of one of the selectable objects may be received. The mobile device 202 may then take action based on the selection of the selectable object in the enhanced presentation. For example, if the user selected the second-page button 226, then, the mobile device 202 would show the content from the second page.

Figure 5:
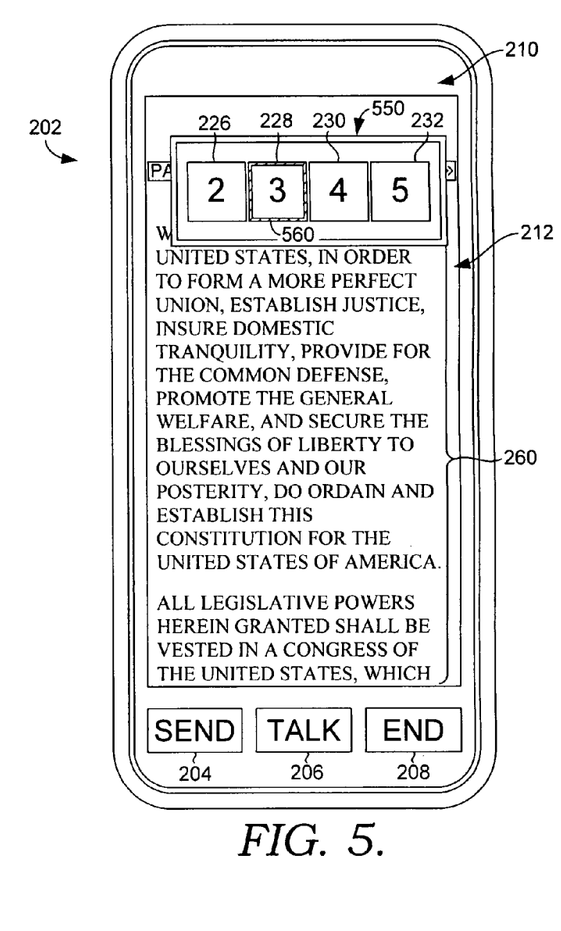
FIG. 5 is a diagram showing an enhanced presentation generated by zooming into a selection cluster and presented in a pop-up window, in accordance with an embodiment of the present invention.

Turning now to FIG. 5, an enhanced presentation generated by zooming into a selection cluster is shown in a pop-up window, in accordance with an embodiment of the present invention. FIG. 5 is similar to FIG. 4, except that the enhanced presentation is shown in pop-up window 550. In another variation on embodiments of the present invention, the presumptively selected third-page button 228 is shown highlighted 560. A selectable object becomes the presumptively selected object when a touch input is received proximate to the location of the selectable object. Upon selecting one of the selectable objects shown in pop-up window 550, the mobile device 202 may take the action required in response to the selection of a selectable object.

Figure 6:
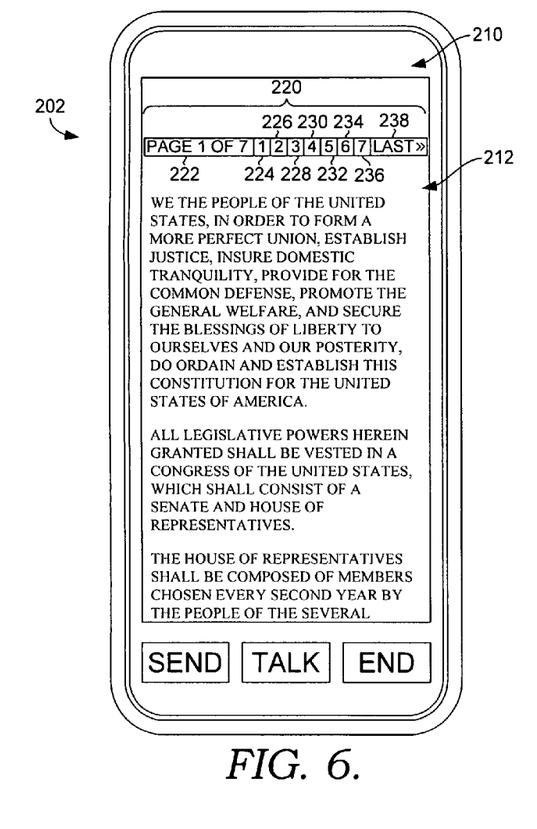
FIG. 6 is a diagram showing a user interface containing multiple selectable objects prior to selection of a selectable object by a finger, in accordance with an embodiment of the present invention.
Figure 7:
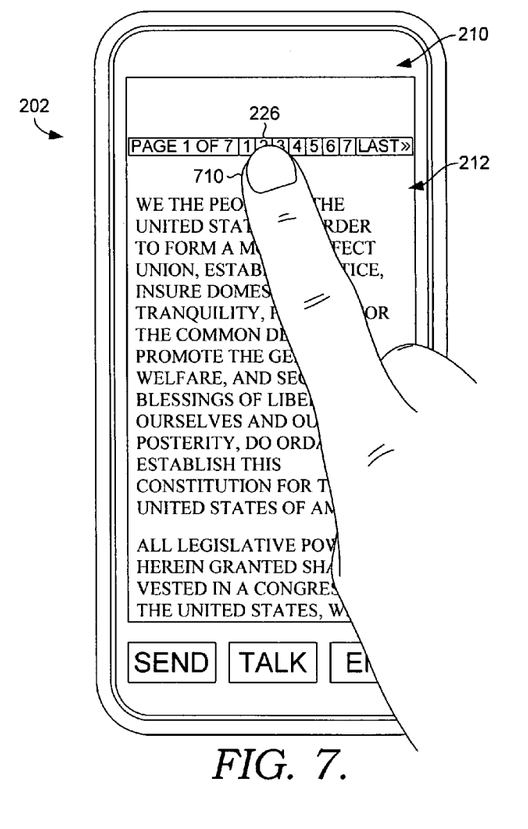
FIG. 7 is a diagram showing the placement of a finger on the touch screen proximate to a selectable object, in accordance with an embodiment of the present invention.

Turning now to FIGS. 6, 7, 8, 9, and 10, an enhanced presentation activated by holding an object on the touch screen near a selectable object is illustrated, in accordance with an embodiment of the present invention. In FIG. 6 a user interface containing multiple selectable objects is shown prior to selection of a selectable object by a user's finger, in accordance with an embodiment of the present invention. The user interface 212 and control bar 220 have been explained previously with reference to FIG. 2. In FIG. 7, the placement of a user's finger 710 on the touch screen 210 proximate to a selectable object is shown, in accordance with an embodiment of the present invention. As can be seen, a user places their finger 710 on the touch screen 210 proximate to the second-page button 226.

Figure 8:
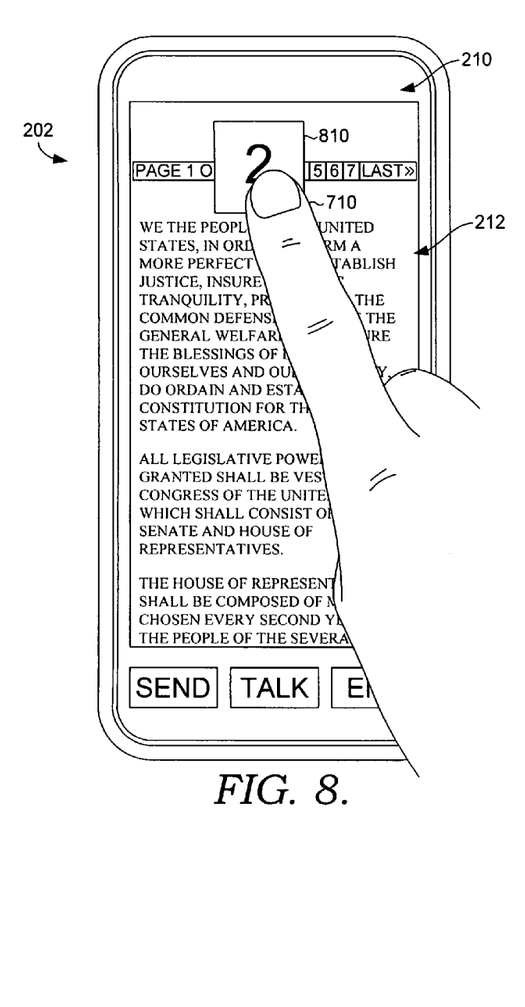
FIG. 8 is a diagram showing an enhanced presentation that is displayed in response to detecting the presumptive selection of the second-page button, in accordance with an embodiment of the present invention.

In FIG. 8, an enhanced presentation 810 that is displayed in response to detecting the placement of the finger 710 proximate to the second-page button 226 is shown, in accordance with an embodiment of the present invention. The enhanced presentation 810 is an enlargement of the second-page button 226. In one embodiment, the enhanced presentation 810 is displayed while the finger 710 remains in contact with the touch screen 210. If the user wishes to select the second-page button 226, then the user may simply remove their finger 710 from the touch screen 210 for the final selection of the second-page button 226 to be made.

Figure 9:
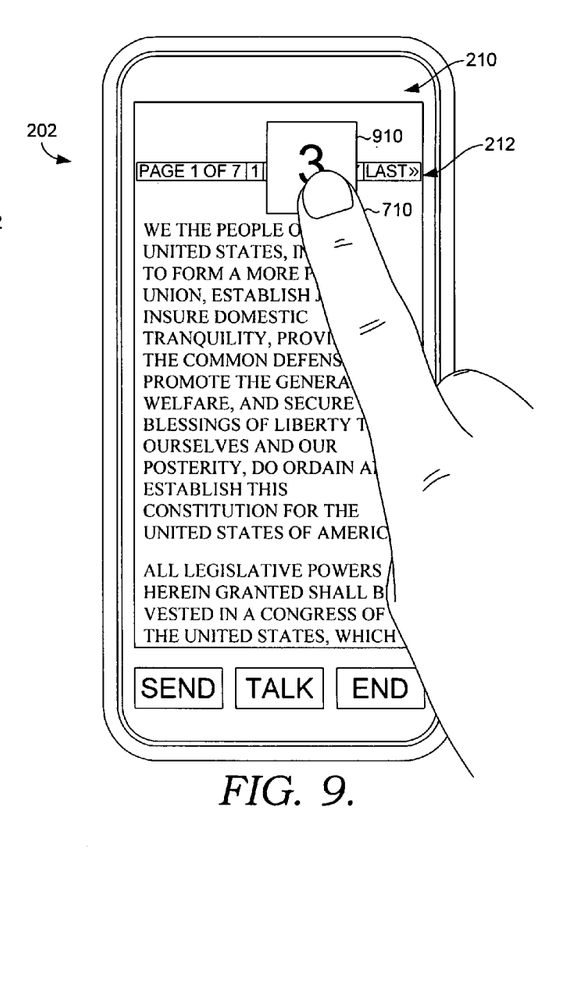
FIG. 9 is a diagram showing a second enhanced presentation that is displayed as a result of a user sliding their finger to a different selectable object, in accordance with an embodiment of the present invention.

In FIG. 9 a second enhanced presentation 910 displayed as a result of the user sliding their finger 710 to a different selectable object is shown, in accordance with an embodiment of the present invention. If the user does not wish to select the second-page button 226, which was their presumptive selection, then the user slides their finger 710 to a different selectable object. Upon selecting a different selectable object, a second enhanced presentation 910 showing the enlarged view of the different selectable object is shown The second enhanced presentation 910 shows an enlarged view of the third-control button 228, which the user has selected by sliding their finger 710 to the right. The user may then select the second selectable object by removing their finger 710 from the touch screen 210. Upon removing their finger 710 from the touch screen 210, the second enhanced presentation 910 disappears.

Figure 10:
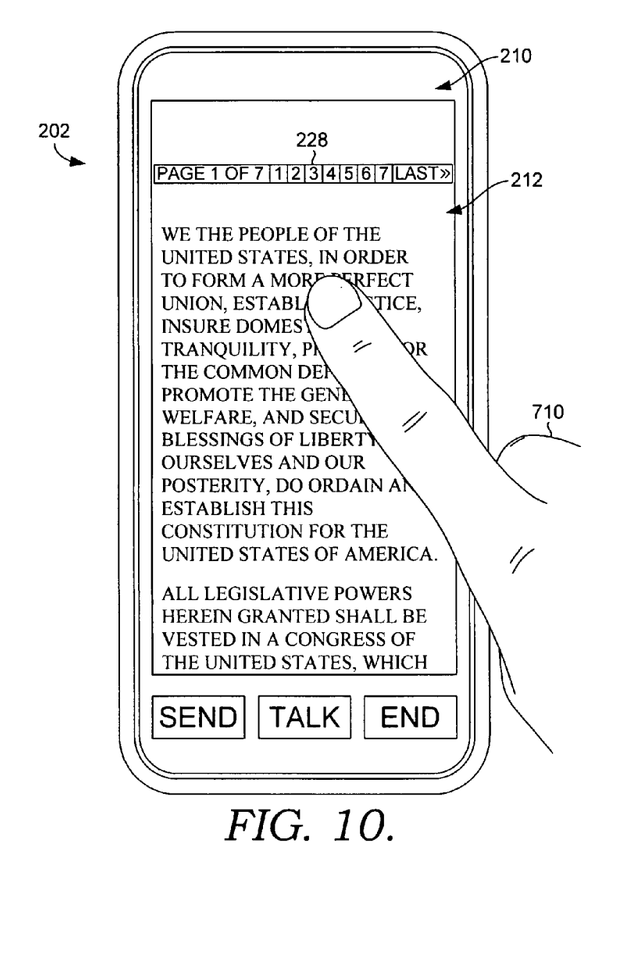
FIG. 10 is a diagram showing the removal of the enhanced presentation upon removal of the finger from the touch screen, in accordance with an embodiment of the present invention.

In FIG. 10, the removal of the enhanced presentation upon removal of the finger 710 from the touch screen 210 is shown, in accordance with an embodiment of the present invention. In addition to removing the enhanced presentation, the user interface may change according to the instructions associated with the selection of the selectable object.

Figure 11:
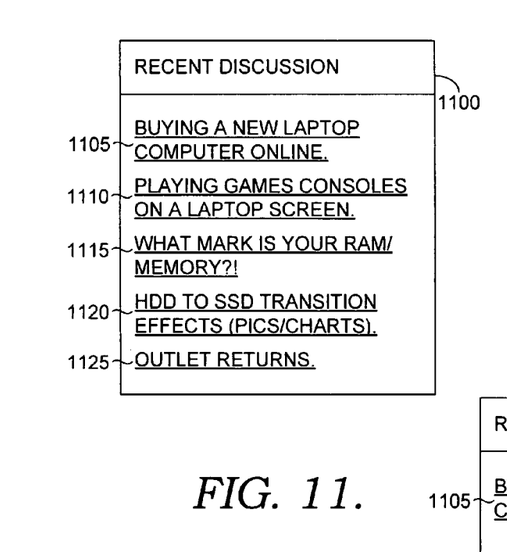
FIG. 11 is a diagram showing a selection cluster of textual hyperlinks, in accordance with an embodiment of the present invention.

Turning now to FIG. 11, a selection cluster formed by textual hyperlinks is shown, in accordance with an embodiment of the present invention. The user interface 1100 includes five textual hyperlinks: the "Buying a new laptop computer online" hyperlink 1105; the "Playing Games Consoles on a Laptop Screen" hyperlink 1110; the "What mark is your RAM/memory hyperlink 1115; the "HDD to SSD Transition effects (Pics/Charts)" hyperlink 1120; and the "Outlet Returns" hyperlink 1125. Each of these hyperlinks 1105, 1110, 1115, 1120, 1125 is closely spaced with the hyperlink above and/or below. In one embodiment, a selection cluster is present when less than a threshold line spacing separates the hyperlinks. The threshold line spacing may depend on the font size of the textual hyperlinks. In general, the smaller the font size, the larger the threshold distance, since more space is needed between the small hyperlinks to make an unambiguous selection. In one embodiment, a selection cluster is not formed, regardless of the line spacing, if the font size is above a threshold font size.

Figure 12:
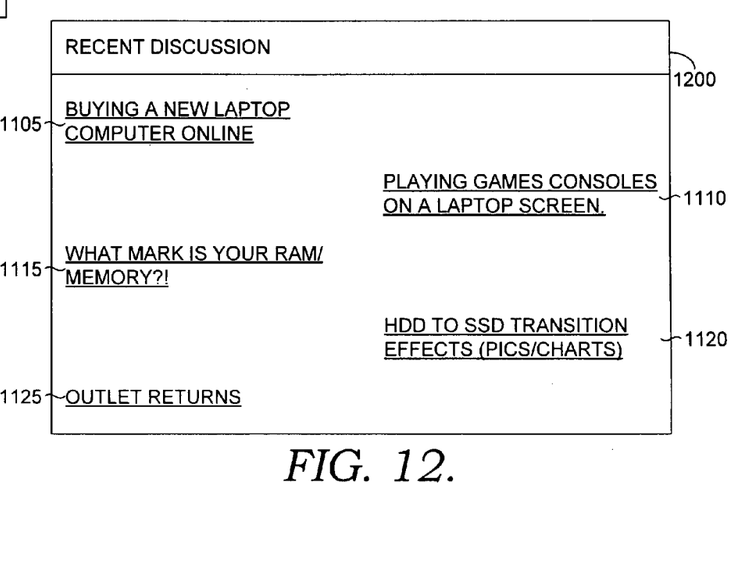
FIG. 12 is a diagram showing an enhanced presentation generated by rearranging the display of textual hyperlinks, in accordance with an embodiment of the present invention.

Turning now to FIG. 12, an enhanced presentation generated by rearranging the display of textual hyperlinks is shown, in accordance with an embodiment of the present invention. All of the hyperlinks described previously with reference to FIG. 11 are shown in FIG. 12. In one embodiment, the enhanced presentation of user interface 1200 is displayed after determining the hyperlinks in user interface 1100 formed a selection cluster. The user interface 1200 increases the spacing between the hyperlinks by displaying them in two columns with a blank row between the hyperlinks.

Figure 13:
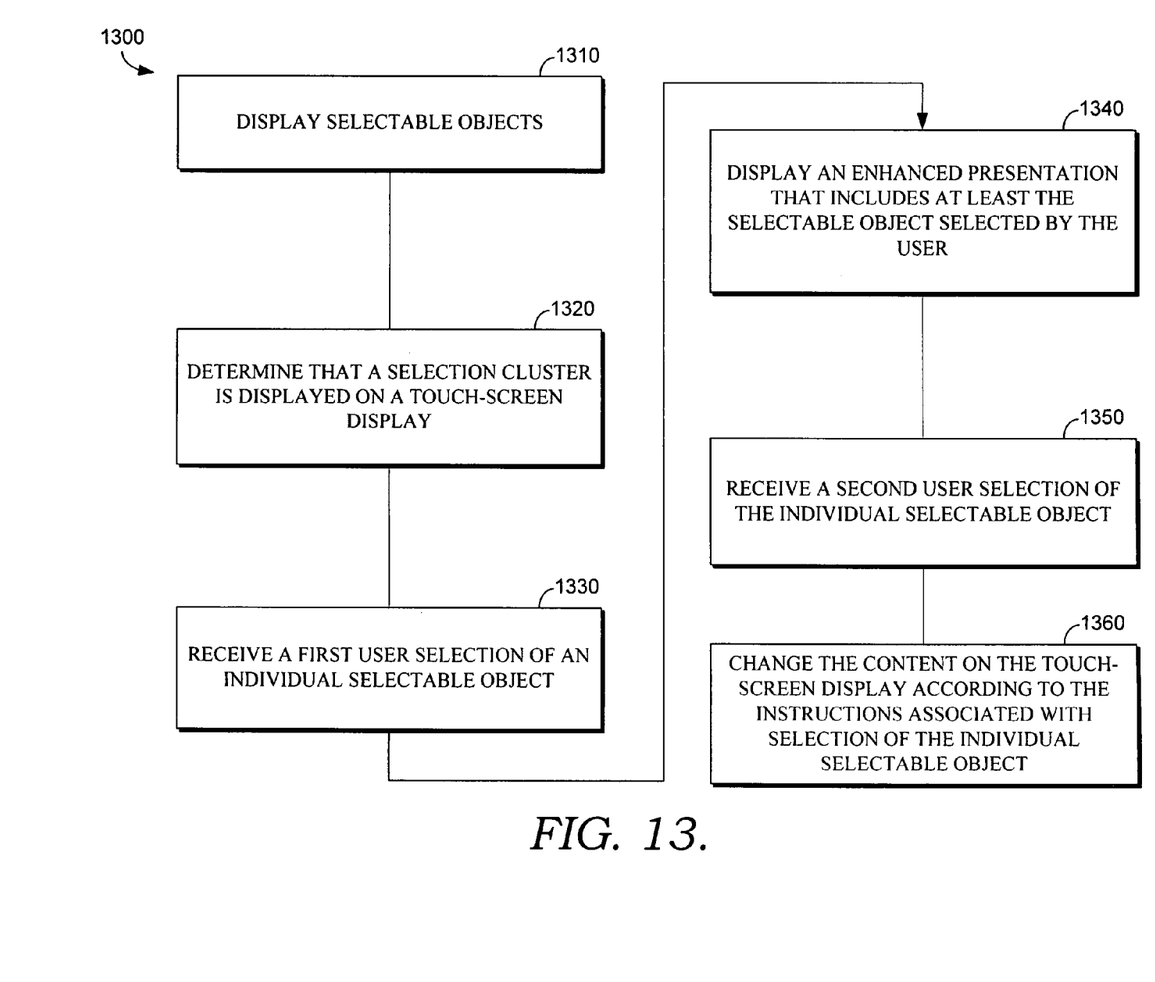
FIG. 13 is a flow chart showing a method of enhancing the selectability of objects displayed on a touch-screen display, in accordance with an embodiment of the present invention.

Turning now to FIG. 13, a method 1300 of enhancing the selectability of objects displayed on a touch screen is shown, in accordance with an embodiment of the present invention. Examples of computing devices on which the method may be performed include PDAs, smart phones, mobile phones, and other computing devices having a touch-screen display. In general, the selectability of selectable objects is enhanced by enlarging the selectable objects or changing the display to increase the distance between the selectable objects.

At step 1310, a user interface that includes selectable objects is displayed on the touch-screen display. Examples of selectable objects includes hypertext links, selectable icons, selectable pictures, and menu items. For example, a webpage displayed on a touch-screen display could include a list of hypertext links and buttons for navigating through the website all of which may be considered selectable objects.

At step 1320, two or more selectable objects are determined to form a selection cluster. A selection cluster is a group of selectable objects that are difficult to individually select on a touch screen because of the close proximity between the objects within the group of selectable objects. For example, a list of hyperlinked text having below a threshold line spacing for the font size may form a selection cluster. Similarly, a row of closely spaced selectable objects may form a selection cluster. As described previously, the size of the selectable objects may determine the threshold distance between the objects that is required to form a selection cluster. In another embodiment, the total number of selectable objects within an area of screen real estate is used to determine whether a selection cluster exists. In one embodiment, the user's actions are used to determine that a selection cluster exists. A selection cluster is determined to exist when the user's actions indicate they are having difficulty selecting a selectable object. For example, a selection cluster may exist when the user selects one or more selectable objects and then hits the back button two or more times within a threshold time period.

At step 1330, a first user selection of an individual selectable object within the selection cluster is received through the touch-screen display. The first user selection may be made by the user placing a finger or stylus proximate to the selectable object. The first user selection is treated as a presumptive selection. The computing device does not take the action instructed by the selection of the selectable object when the selection is treated as presumptive rather than definite.

At step 1340, an enhanced presentation of at the least a portion of the selectable objects within the selection cluster is displayed. The enhanced presentation increases the ease with which individual selectable objects within the selection cluster may be selected through the touch screen. As described previously, the enhanced presentation may be presented in a new window or by altering the user interface in which the selection cluster is present. In one embodiment, the enhanced presentation is generated by zooming into an area where the selection cluster is displayed. The zoom display may be presented in a pop-up window or generated by zooming into a portion of the current user interface. In another embodiment, the spacing between the selectable objects within the selection cluster may be increased.

At step 1350, a second user selection is received through the touch screen of the individual selectable object within the selection cluster. The individual selectable object may be the same as the originally selected selectable object. On the other hand, the user could have selected a different selectable object, when the enhanced presentation revealed that they had inadvertently selected an unintended selectable object. At step 1360, the content displayed on the touch-screen display is changed according to the instructions associated with the selection of the individual selectable object. In other words, the mobile device takes the action required as a result of selecting the selectable objects. Changing the display may include removing the enhanced presentation from the display. For example, the normal zoom of the user interface may be restored upon receiving the selection of the individual selectable object. The second selection results in a definite or finalized selection rather than a presumptive selection because the instruction associated with selecting the selectable object is performed.

Figure 14:
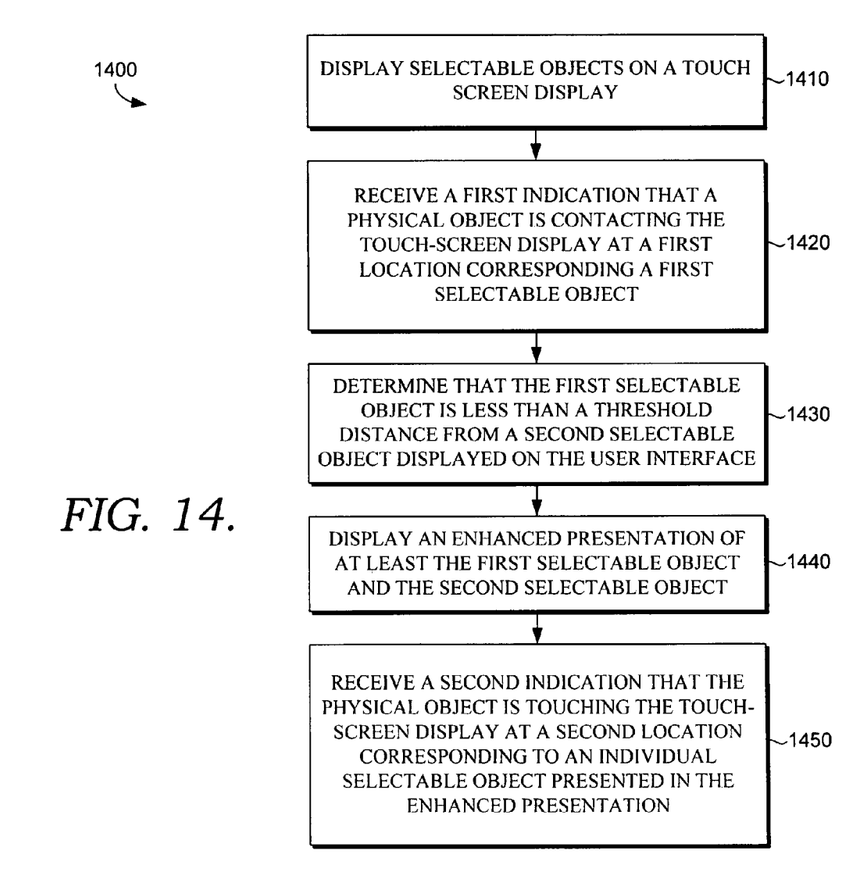
FIG. 14 is a flow chart showing a method of enhancing the selectability of objects displayed on a touch-screen display, in accordance with an embodiment of the present invention.

Turning now to FIG. 14, a method 1400 of enhancing selectability of objects displayed on a touch-screen display is shown, in accordance with an embodiment of the present invention. As described previously, the selectability of selectable objects may be enhanced by enlarging the selectable objects or increasing the space between the selectable objects. At step 1410, selectable objects are displayed on the touch-screen display. At step 1420, a first indication that a physical object is touching the touch screen is received through the touch-screen display. The physical object is determined to be contacting the touch screen at a first location corresponding to a first selectable object, thereby indicating a presumptive selection of the first selectable object.

At step 1430, the first selectable object is determined to be less than a threshold distance from a second selectable object displayed on the user interface. As described previously, the threshold distance may vary depending on the size of the selectable objects involved. In general, the larger the selectable object the smaller the threshold distance.

At step 1440, an enhanced presentation of at least the first selectable object and the second selectable object is displayed. The enhanced presentation is displayed prior to taking action based on the presumptive selection of the first selectable object. At step 1450, a second indication that the physical object is touching the touch screen at a second location is received. The second location corresponds to an individual selectable object presented in the enhanced presentation. The second indication is treated as a definite selection of the individual selectable object. The individual selectable object may be the same as the first selectable object or different than the first selectable object. The individual selectable object may be an object displayed in the enhanced presentation.

Figure 15:
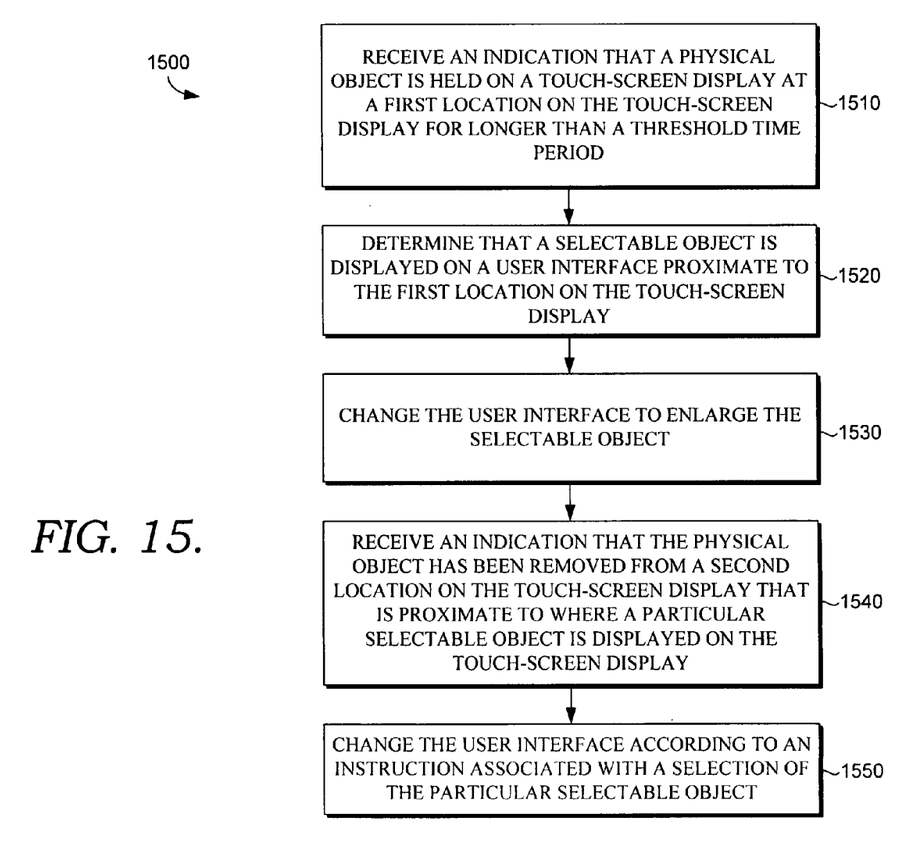
FIG. 15 is a flow chart showing a method of disambiguating a selection of an object on a touch-screen display, in accordance with an embodiment of the present invention.

Turning now to FIG. 15, a method 1500 of disambiguating a selection of an object on a touch-screen display is shown, in accordance with an embodiment of the present invention. At step 1510, an indication that a physical object is held on the touch screen at a first location of the touch screen is received. The physical object may be held on the touch screen for longer than a threshold period of time. For example, a user may place their finger on a portion of the touch screen and hold it there waiting for additional steps of the present method to be performed. At step 1520, a selectable object is determined to be displayed proximate to the first location on the user interface presently being displayed on the touch screen.

At step 1530, the user interface is changed to enlarge the selectable object and to provide an indication that the selectable object is presumptively selected. The indication may include enlarging only the selectable object to the exclusion of other selectable objects nearby. In another embodiment, the indication is highlighting the selectable object. In another embodiment, the indication is causing the selectable object to flash. Other similar indications may be used to communicate that the selectable object is presumptively selected.

At step 1540 an indication that the physical object has been removed from a second location on the touch screen that is adjacent to a particular selectable object is received. The second location may be the same as the first location. If this is the case, the presumptively selected selectable object is the same as the particular selectable object. Thus, a user may hold their finger on the touch screen until the enlarged selectable object is presented. Upon removing their finger from the display the selection of the selectable object is made definite.

At step 1550, the user interface is changed according to instructions associated with the selection of a particular selectable object. Thus, a computing device performing method 1500 takes whatever action it otherwise would, upon receiving a user selection of the particular selectable object.

In one embodiment, the second location is different than the first location and may correspond with a different selectable object. In this case, the user interface may be updated as the user slides their finger or stylus across the touch-screen display to provide an enlarged view of other selectable objects close to the new location of their finger. Upon removing their finger from the touch screen, the selectable object displayed in an enlarged view is selected.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having one or more computer-executable instructions embodied thereon for performing a method of enhancing selectability of objects displayed on a touch-screen display, the method comprising:
    determining that a selection cluster is displayed in a user interface on the touch-screen display, wherein the selection cluster comprises a threshold number of two or more selectable objects displayed within a threshold screen area, and wherein the selectable objects are separated by a distance which is less than a threshold distance, wherein the threshold distance is based on a size of each of the selectable objects such that the threshold distance is shorter for large objects and longer for small objects;
    receiving through the touch-screen display a first user selection of an individual selectable object within the selection cluster;
    displaying an enhanced presentation that includes the individual selectable object and at least a portion of the selectable objects within the selection cluster, wherein the enhanced presentation increases the distance between the selectable objects within the selection cluster by zooming into a portion of the user interface comprising the selection cluster and at least one non-selectable object according to a degree of zoom based on the distance between the selectable objects and a size of each selectable object;
    receiving a second user selection through the touch-screen display of the individual selectable object within the enhanced presentation; and
    changing content displayed on the touch-screen display according to instructions associated with selection of the individual selectable object.

2. The media of claim 1, wherein determining that the two or more of the selectable objects form the selection cluster is based on an analysis of recent user selections that indicate the user is selecting an unintended selectable object.

3. The media of claim 2, wherein the user is selecting the unintended selectable object when two selections of a particular selectable object are followed by a back arrow within a threshold period of time.

4. The media of claim 1, wherein said selection cluster includes textual links with less than a threshold line spacing.

5. The media of claim 1, wherein the enhanced presentation is generated by automatically zooming into a portion of the user interface around the individual selectable object.

6. The media of claim 5, wherein the enhanced presentation is displayed in a pop-up window.

7. One or more non-transitory computer-readable media having one or more computer-executable instructions embodied thereon for performing a method of enhancing selectability of objects displayed on a touch-screen display, the method comprising:
    receiving, through the touch-screen display, a first indication that a physical object is contacting the touch-screen display at a first location corresponding to a first selectable object being displayed in a user interface on the touch-screen display, thereby indicating a presumptive selection of the first selectable object;
    determining that the first selectable object is part of a selection cluster comprising a threshold number of two or more selectable objects displayed within a threshold screen area and wherein the first selectable object is less than a threshold distance from a second selectable object of the selection cluster, wherein the threshold distance is based on a size of each of the selectable objects such that the threshold distance is shorter for large objects and longer for small objects;
    prior to taking action based on the presumptive selection of the first selectable object, displaying an enhanced presentation of the selection cluster, wherein the enhanced presentation increases a distance between the selectable objects within the selection cluster by zooming into a portion of the user interface comprising the selectable objects and at least one non-selectable object according to a degree of zoom based on the distance between the selectable objects and a size of each selectable object; and
    receiving, through the touch-screen display, a second indication that the physical object is touching the touch-screen display at a second location corresponding to an individual selectable object presented in the enhanced presentation, thereby indicating a definite selection of the individual selectable object.

8. The media of claim 7, wherein the first selectable object and the second selectable object are textual links, and wherein the threshold distance is less than a threshold line spacing.

9. The media of claim 7, wherein the enhanced presentation is generated by automatically zooming into an area around the first selectable object and the second selectable object.

10. The media of claim 9, wherein the enhanced presentation is displayed in a pop-up window.

11. The media of claim 7, wherein the enhanced presentation displays the first selectable object and the second selectable object with increased distance between the first selectable object and the second selectable object without changing a size of the first selectable object and the second selectable object.

12. The media of claim 7, further comprising highlighting the first selectable object within the enhanced presentation, thereby indicating the first selectable object is presumptively selected.

13. A method of disambiguating a selection of an object on a touch-screen display, the method comprising:

receiving, at a mobile device that is coupled to the touch-screen display, a first indication that a physical object is held on the touch-screen display at a first location on the touch-screen display longer than a threshold time period;

determining that a selectable object is displayed on a user interface proximate to the first location on the touch-screen display, wherein the selectable object is part of a selection cluster comprising a threshold number of two or more selectable objects displayed within a threshold area of the touch-screen display and separated by a distance which is less than a threshold distance, wherein the threshold distance is based on a size of each of the selectable objects such that the threshold distance is shorter for large objects and longer for small objects;

changing the user interface to enlarge the selection cluster indicating that the selectable object within the enlarged selection cluster is presumptively selected by zooming into a portion of the user interface comprising the selectable objects and at least one non-selectable object according to a degree of zoom based on the distance between the selectable objects and a size of each selectable object;

receiving a second indication that the physical object has been removed from the touch-screen display and was last in contact with the touch-screen display at a second location that is proximate to where a particular selectable object is displayed on the touch-screen display within the selection cluster; and changing the user interface according to an instruction associated with selecting the particular selectable object.

14. The method of claim 13, wherein the first location is the same as the second location and the particular selectable object is the same as the selectable object.

15. The method of claim 13, wherein the method further includes:

determining that the physical object moved to the second location without breaking contact with the touch-screen display;

determining that a new selectable object is displayed on the touch-screen display proximate to the second location;

changing an appearance of the new selectable object to indicate that the new selectable object is presumptively selected by a user of the mobile device; and wherein the new selectable object is the particular selectable object.

* * * * *